(12) United States Patent
Yazaki et al.

(10) Patent No.: US 8,265,072 B2
(45) Date of Patent: Sep. 11, 2012

(54) FRAME SWITCHING DEVICE

(75) Inventors: Takeki Yazaki, Hachioji (JP); Shinichi Akahane, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 11/207,799

(22) Filed: Aug. 22, 2005

(65) Prior Publication Data

US 2006/0072565 A1 Apr. 6, 2006

(30) Foreign Application Priority Data

Oct. 4, 2004 (JP) ................................. 2004-291394

(51) Int. Cl.
 *H04L 12/56* (2006.01)
(52) U.S. Cl. ....................................................... 370/389
(58) Field of Classification Search ................. 370/235, 370/237, 255, 389, 312
 See application file for complete search history.

(56) References Cited

U.S. PATENT DOCUMENTS

| 5,034,919 | A  | * | 7/1991 | Sasai et al. ................... 365/49.1 |
| 6,266,705 | B1 | * | 7/2001 | Ullum et al. ................... 709/238 |
| 6,445,709 | B1 | * | 9/2002 | Chiang ........................ 370/399 |
| 6,570,875 | B1 | * | 5/2003 | Hegde ........................... 370/389 |
| 6,778,547 | B1 | * | 8/2004 | Merchant ....................... 370/422 |
| 7,058,642 | B2 | * | 6/2006 | Kurupati et al. ............... 707/101 |
| 7,367,052 | B1 | * | 4/2008 | Desanti ............................. 726/3 |
| 2003/0043802 | A1 |   | 3/2003 | Yazaki et al. |

FOREIGN PATENT DOCUMENTS

JP 07-030554 1/1995

OTHER PUBLICATIONS

Uga et al., "A Flow Identification Method Using Content Addressable Memory", NTT Network Service Systems Laboratories, in Japanese (2000), p. 654.
V. Srinivasan et al., "Fast and Scalable Layer Four Switching", SIGCOMM 98, (1998), pp. 191-202.
Japanese Patent Office Notice of Reason of Rejection, Japanese Application 2004-291394, dated Jun. 2, 2009, in Japanese.
Uga et al., "A Flow Identification Method Using Content Addressable Memory", NTT Network Service Systems Laboratories, in Japanese (2000), p. 654, and English translation, 5 pages.
"CAM (Content-Addressable Memory)", in Japanese, pp. 84-85, and English translation, 3 pages, Aug. 2001.

* cited by examiner

*Primary Examiner* — Anh-Vu Ly
*Assistant Examiner* — Mohammad Anwar
(74) *Attorney, Agent, or Firm* — Stites & Harbison, PLLC; Juan Carlos A. Marquez, Esq

(57) ABSTRACT

A header processing unit includes a key information supply unit that manages MAC addresses and MAC key information having a short bit length that corresponds to the addresses, and decides key information corresponding to a source MAC address and a destination MAC address of an input frame. A destination decision unit performs destination decision processing based on corresponding key information instead of destination MAC addresses. A flow decision unit decides a flow based on key information corresponding to a destination MAC address and a source MAC address. Since the key information supply unit does not need to set plural identical MAC addresses, the header processing unit becomes inexpensive. Thus, this invention achieves an inexpensive switch that performs output decision processing and flow decision processing.

10 Claims, 14 Drawing Sheets

FIG.9

CAM 132

| ADDRESS | MAC KEY INFORMATION | VLAN ID | |
|---|---|---|---|
| 1 | MAC KEY INFORMATION 1 | VLAN ID 1 | 135-1 |
| 2 | MAC KEY INFORMATION 2 | VLAN ID 2 | 135-2 |
| 3 | MAC KEY INFORMATION 3 | VLAN ID 3 | 135-3 |
| 4 | MAC KEY INFORMATION 4 | VLAN ID 4 | 135-4 |
| 5 | MAC KEY INFORMATION 5 | VLAN ID 5 | 135-5 |
| 6 | MAC KEY INFORMATION 6 | VLAN ID 6 | 135-6 |
| 7 | MAC KEY INFORMATION 7 | VLAN ID 7 | 135-7 |
| ⋮ | ⋮ | ⋮ | |
| m | MAC KEY INFORMATION m | VLAN ID m | 135-m |

FIG.10

DESTINATION INFORMATION TABLE 133

| ADDRESS | | |
|---|---|---|
| 1 | OUTPUT PORT NUMBER 1 | 136-1 |
| 2 | OUTPUT PORT NUMBER 2 | 136-2 |
| 3 | OUTPUT PORT NUMBER 3 | 136-3 |
| 4 | OUTPUT PORT NUMBER 4 | 136-4 |
| 5 | OUTPUT PORT NUMBER 5 | 136-5 |
| 6 | OUTPUT PORT NUMBER 6 | 136-6 |
| 7 | OUTPUT PORT NUMBER 7 | 136-7 |
| ⋮ | ⋮ | |
| m | OUTPUT PORT NUMBER m | 136-m |

FIG.12

FCAM 143

| ADDRESS | SMAC KEY INFORMATION | DMAC KEY INFORMATION | INPUT PORT NUMBER | VLAN ID | |
|---|---|---|---|---|---|
| 1 | SMAC KEY INFORMATION 1 | DMAC KEY INFORMATION 1 | INPUT PORT NUMBER 1 | VLAN ID 1 | 163-1 |
| 2 | SMAC KEY INFORMATION 2 | DMAC KEY INFORMATION 2 | INPUT PORT NUMBER 2 | VLAN ID 2 | 163-2 |
| 3 | SMAC KEY INFORMATION 3 | DMAC KEY INFORMATION 3 | INPUT PORT NUMBER 3 | VLAN ID 3 | 163-3 |
| 4 | SMAC KEY INFORMATION 4 | DMAC KEY INFORMATION 4 | INPUT PORT NUMBER 4 | VLAN ID 4 | 163-4 |
| 5 | SMAC KEY INFORMATION 5 | DMAC KEY INFORMATION 5 | INPUT PORT NUMBER 5 | VLAN ID 5 | 163-5 |
| 6 | SMAC KEY INFORMATION 6 | DMAC KEY INFORMATION 6 | INPUT PORT NUMBER 6 | VLAN ID 6 | 163-6 |
| 7 | SMAC KEY INFORMATION 7 | DMAC KEY INFORMATION 7 | INPUT PORT NUMBER 7 | VLAN ID 7 | 163-7 |
| ------ | | | | | |
| n | SMAC KEY INFORMATION n | DMAC KEY INFORMATION n | INPUT PORT NUMBER 8 | VLAN ID n | 163-n |

FIG.17

UNUSED KEY INFORMATION TABLE 152

| | |
|---|---|
| READ ADDRESS → | UNUSED KEY INFORMATION 1 — 167-1 |
| | UNUSED KEY INFORMATION 2 — 167-2 |
| VALID UNUSED KEY INFORMATION | UNUSED KEY INFORMATION 3 — 167-3 |
| | UNUSED KEY INFORMATION 4 — 167-4 |
| | UNUSED KEY INFORMATION 5 — 167-5 |
| WRITE ADDRESS → | UNUSED KEY INFORMATION 6 — 167-6 |
| | ⋮ |
| | UNUSED KEY INFORMATION p — 167-p |

*Prior Art* FIG.18

CAM 1801

| | MAC ADDRESS | OUTPUT PORT NUMBER |
|---|---|---|
| 1810-1 | MAC ADDRESS 1 | OUTPUT PORT NUMBER 1 |
| 1810-2 | MAC ADDRESS 2 | OUTPUT PORT NUMBER 2 |
| 1810-3 | MAC ADDRESS 3 | OUTPUT PORT NUMBER 3 |
| 1810-4 | MAC ADDRESS 4 | OUTPUT PORT NUMBER 4 |
| 1810-5 | MAC ADDRESS 5 | OUTPUT PORT NUMBER 5 |
| 1810-6 | MAC ADDRESS 6 | OUTPUT PORT NUMBER 6 |
| 1810-7 | MAC ADDRESS 7 | OUTPUT PORT NUMBER 7 |
| 1810-8 | MAC ADDRESS 8 | OUTPUT PORT NUMBER 8 |
| | MATCH CONDITION | RELATED INFORMATION |

FRAME SWITCHING DEVICE

CLAIM OF PRIORITY

The present application claims priority from Japanese application JP 2004-291394 filed on Oct. 4, 2004, the content of which is hereby incorporated by reference into this application.

FIELD OF THE INVENTION

The present invention relates to a frame switching device, and more particularly to an inexpensive frame switching device that includes a destination decision unit that decides the destination of an input frame, and a flow decision unit that decides the flow to which the input frame belongs. Also, the present invention relates to a frame switching device that achieves both the speedup and the low cost of the destination decision unit and the flow decision unit by using CAM (Contents Addressable Memory).

BACKGROUND OF THE INVENTION

A switch constituting a network decides, from the destination MAC address of an inputted frame, an output port through which the frame is to be outputted, before transmitting the frame. A destination decision unit in the switch performs destination decision processing for deciding the output port. The destination decision unit includes a forwarding data base that stores plural forwarding entries each consisting of a MAC address and a port number corresponding to the address. When a frame is inputted, the destination decision unit determines whether a destination MAC address in a header matches any of MAC addresses of forwarding entries, and decides a port number in a matching entry as the port number of an output port of the inputted frame. When there is no matching forwarding entry, the switch performs flooding to transmit the inputted frame to all output ports.

The destination decision unit performs address learning for creating a forwarding data base in addition to the destination decision processing. This processing compares a MAC address in a forwarding entry with a source MAC address in a header, and when there is no matching forwarding entry, registers the source MAC address in the header and a port number inputted by the inputted frame as a MAC address and a port number of the forwarding entry, respectively.

Rich Seifert, "LAN Switching Detailed Description" Nikkei BP Inc. describes a high speed destination decision method by use of CAM (Contents Addressable Memory), which is a device for fast search. CAM includes plural match conditions, and when a search key is inputted, determines whether the search key matches any of the plural match conditions. When a match condition exists, it outputs information related with the match condition, and when there is no match condition, outputs the information indicating that there is no match condition.

FIG. 18 is a conceptual diagram of a destination decision unit to which Rich Seifert, "LAN Switching Detailed Description" Nikkei BP Inc. is applied. In the destination decision unit in Rich Seifert, "LAN Switching Detailed Description" Nikkei BP Inc., as shown in FIG. 18, MAC addresses in the forwarding data base as match conditions, and output port numbers corresponding to those addresses as related information are stored in CAM 1801. When a frame is inputted, the CAM 1801 determines whether a destination MAC address in the frame matches any of MAC addresses as match conditions, and decides a port number corresponding to a matching match condition as an output port number through which the inputted frame is to be outputted. Also in address learning, to check for the existence of a forwarding entry matching a source MAC address, the source MAC address has only to be inputted to the CAM 1801 as a search key.

The switch may include a flow decision unit in addition to the destination decision unit. The flow decision unit performs flow decision processing that decides the flow to which a frame belongs from information in a header of the frame. The flow refers to a flow of frames with same particular header information. The flow decision unit has plural flow entries that each stores a flow condition consisting of combinations of different items of a frame header such as a source address and a destination address, and flow information corresponding to the flow condition. Flow control information may include any one, or two or more of filter information indicating frame transmission, QoS information indicating frame transmission priority, and statistics information. When a frame is inputted, the switch searches for a flow entry having a flow condition that matches information in the frame, and based on flow information of the matching entry, decides filter information, QoS information, and collects statistics.

According to a method described in V. Srinivasan, G. Varghese, S. Suri, M. Waldvogel, "Fast and Scalable Layer Four Switching", Proceedings of ACM SIGCOMM '98, pp. 191-202, high speed flow decision processing called cross-producing is described. In this method, flow conditions are split into small field conditions such as destination address and source address. The flow decision processing determines for each field whether information in a header matches any of the split flow conditions, and based on individual comparison results, decides a finally matching flow entry. As a method of deciding a final flow entry, there is described a method for providing a cross product table that stores indication information of a flow entry to match among all possible combinations from the split flow conditions. For example, when the flow conditions consist of five fields and the respective numbers of split flow conditions are 4, 4, 5, 2, and 3, the number of pieces of indication information of matching flow entries is 480 (=4×4×5×2×3). V. Srinivasan, G. Varghese, S. Suri, M. Waldvogel, "Fast and Scalable Layer Four Switching", Proceedings of ACM SIGCOMM '98, p 191-202 also describes "On-demand cross producing" that reduces the number of entries of the cross product table. This method sets entries of the cross product table on demand. When necessary entries exist in the cross product table, the same processing as the cross producing is performed. When no necessary entries exist in the cross product table, low-speed flow decision processing such as normal linear search is performed, and indication information corresponding to a processed packet is created in the cross product table.

Furthermore, in Uga, et. al. "Flow Identification Method by Use of Contents Addressable Memory" Institute Electronic, Information and Communication and Engineers, 2000 Comprehensive Convention Lecture Papers SB-4-2, a method for speeding up router's flow decision processing by use of TCAM (Ternary Contents Addressable Memory) is described. TCAM allows not only comparison of "0" and "1" for each bit of match conditions but also a comparison mask (wildcard) of "0" and "1" that indicates any information is permitted.

FIG. 19 is a conceptual diagram of a flow decision unit to which Uga, et. al. "Flow Identification Method by Use of Contents Addressable Memory" Institute Electronic, Information and Communication and Engineers, 2000 Comprehensive Convention Lecture Papers SB-4-2 is applied.

This method will be described below using the conceptual diagram of Uga et. al. "Flow Identification Method by Use of Contents Addressable Memory" Institute Electronic, Information and Communication and Engineers, 2000 Comprehensive Convention Lecture Papers SB-4-2. FIG. 19 shows TCAM 1901 that stores plural entries 1910-$i$ ($i$=1 to N) describing flow conditions created by combinations of source address, destination address, and protocols, and a search result table 1902 that stores flow information 1920-$i$ describing flow information corresponding to the entry 1910-$i$. "d.c" is a mask indicating that any information is permitted. When a frame is inputted, it is determined whether header information of a packet matches any of entries 1910-$i$, and based on flow information 1920-$i$ corresponding to a matching entry 1910-$i$, filter information and QoS information are decided and statistics is collected.

Furthermore, JP-A No. 78549/2003 "Packet Transmission Method and Device" describes a flow decision method that reduces the number of set flow entries. For example, when a flow is decided for each destination address and for each source address, the number of flow entries required in the flow decision unit to which Uga et. al. "Flow Identification Method by Use of Contents Addressable Memory" Institute Electronic, Information and Communication and Engineers, 2000 Comprehensive Convention Lecture Papers SB-4-2 is applied is the product of the number of variations of destination addresses multiplied by the number of variations of source addresses. A flow decision unit described in JP-A No. 78549/2003 "Packet Transmission Method and Device" includes a flow decision unit of V. Srinivasan, G. Varghese, S. Suri, M. Waldvogel, "Fast and Scalable Layer Four Switching", Proceedings of ACM SIGCOMM '98, p 191-202 as a previous-stage flow decision unit and a following-stage flow decision unit. TCAM of the previous-stage flow decision unit contains as many flow conditions as there are variations of destination addresses, wherein each of the flow conditions other than conditions of destination address is masked. TCAM of the following-stage flow decision unit contains the flow condition of the temporal flow number decided in the previous-stage flow decision unit, the flow condition of a source address, and flow conditions each of which is masked. When a frame is inputted, the previous-stage flow decision unit performs first flow decision processing according to header information of the input frame to decide the temporal flow number determined from only a destination address. The following-stage flow decision unit performs second flow decision processing to decide a final flow from the temporal flow number and the header information. The number of set flow entries is the sum of the number of variations of destination addresses and the number of variations of source addresses. Therefore, when the respective numbers of variations are large, the flow decision unit of JP-A No. 78549/2003 "Packet Transmission Method and Device" can reduce the number of flow entries set in the flow decision unit of V. Srinivasan, G. Varghese, S. Suri, M. Waldvogel, "Fast and Scalable Layer Four Switching", Proceedings of ACM SIGCOMM '98, p 191-202.

The above-mentioned Uga et. al. "Flow Identification Method by Use of Contents Addressable Memory" Institute Electronic, Information and Communication and Engineers, 2000 Comprehensive Convention Lecture Papers SB-4-2 and Rich Seifert, "LAN Switching Detailed Description" Nikkei BP Inc. have a problem with low-cost achievement of both of the destination decision unit and the flow decision unit.

When Uga et. al. "Flow Identification Method by Use of Contents Addressable Memory" Institute Electronic, Information and Communication and Engineers, 2000 Comprehensive Convention Lecture Papers SB-4-2 and Rich Seifert, "LAN Switching Detailed Description" Nikkei BP Inc. are applied, the above-mentioned destination decision unit and the flow decision unit are required individually. In the CAM 1801 of the destination decision unit, all MAC addresses used for destination decision are set. In the TCAM 1901 of the flow decision unit, source MAC addresses and destination MAC addresses are respectively set as conditions of source addresses and destination addresses. In this case, identical MAC addresses may be set in the CAMs of the destination decision unit and the flow decision unit. For example, when a MAC address corresponding to a source address x and a destination address x of FIG. 19 is a MAC address x, a MAC address 1 and the like are set in the CAM 1801 and the TCAM 1901. Since the destination decision unit and the flow decision unit to which Uga et. al. "Flow Identification Method by Use of Contents Addressable Memory" Institute Electronic, Information and Communication and Engineers, 2000 Comprehensive Convention Lecture Papers SB-4-2 and V. Srinivasan, G. Varghese, S. Suri, M. Waldvogel, "Fast and Scalable Layer Four Switching", Proceedings of ACM SIGCOMM '98, p 191-202 are applied must redundantly set MAC addresses having the long bit length of 48 bits, CAM capacity cannot be efficiently used. The wasteful use of CAM capacity causes an increase in the costs of the destination decision unit and the flow decision unit.

In TCAM of a flow decision unit to which JP-A No. 78549/2003 "Packet Transmission Method and Device" and Uga et. al. "Flow Identification Method by Use of Contents Addressable Memory" Institute Electronic, Information and Communication and Engineers, 2000 Comprehensive Convention Lecture Papers SB-4-2 are applied, masks of MAC addresses are set as flow conditions. In the flow decision unit of JP-A No. 78549/2003 "Packet Transmission Method and Device", in the case where the pre-stage flow decision unit decides the temporal flow number by a source MAC address, and the following-stage flow decision unit decides a final flow based on a destination MAC address, a destination MAC address of a flow entry of the pre-stage flow decision unit and a source MAC address of a flow entry of the following-stage flow decision unit are masked. In the flow decision unit of Uga et. al. "Flow Identification Method by Use of Contents Addressable Memory" Institute Electronic, Information and Communication and Engineers, 2000 Comprehensive Convention Lecture Papers SB-4-2, masks indicated by d.c are set in the TCAM 1901 of FIG. 19. Since MAC addresses have the long bit length of 48 bits as described previously and CAM capacity becomes large, a more inexpensive flow decision unit can be achieved if the masks can be omitted.

In the case of V. Srinivasan, G. Varghese, S. Suri, M. Waldvogel, "Fast and Scalable Layer Four Switching", Proceedings of ACM SIGCOMM '98, p 191-202, if only MAC address identification conditions are set in CAM, although masks and the conditions of duplicate MAC addresses do not need to be set, there is a problem in that a table that stores indication information of flow entries to match becomes large. When flow conditions consist of K fields and N flow entries exist, a maximum of $N^K$ pieces of indication information are required. For example, when the number of fields is 4 and the number of flow entries is 2048, $2^{44}$ entries are required. Although the use of on-demand cross producing reduces the number of pieces of the indication information, there has been a problem in that flow decision processing slows down remarkably when a cross-product table has no entry.

SUMMARY OF THE INVENTION

The present invention has been made in view of the above circumstances and its object is to inexpensively achieve a destination decision unit and a flow decision unit that have one common MAC address even when identical MAC addresses exist in forwarding entries and flow entries. A further object of the present invention is to achieve a high speed flow decision unit that can omit masks of destination MAC addresses and source MAC addresses, and makes unnecessary a huge table that stores indication information of finally matching flow entries. Another object of the present invention is to achieve a destination decision unit and a flow decision unit that efficiently use CAM capacity by providing only one common MAC address when CAM is used. A still further object of the present invention is to achieve a fast flow decision unit that can omit masks corresponding to MAC addresses to efficiently use CAM capacity, and makes unnecessary a huge table that stores indication information of finally matching flow entries.

A header processing unit of a frame transmission device of the present invention includes a key information supply unit that commonly sets only one MAC address having a long bit length to perform destination decision processing and flow decision processing. The key information supply unit manages MAC addresses and MAC key information corresponding to the addresses, and when a frame is inputted, decides key information corresponding to a source MAC address or a destination MAC address in the frame. MAC addresses managed by the key information supply unit are MAC addresses in forwarding entries, source MAC addresses in flow entries, or MAC addresses corresponding to destination MAC addresses. However, only one of identical MAC addresses may be managed and masks do not need to be stored.

The destination decision unit of the header processing unit of the present invention executes destination decision processing and address learning based on key information corresponding to a destination MAC address or source MAC address instead of the destination MAC address or source MAC address. The flow decision unit decides a flow based on key information corresponding to a destination MAC address and a source MAC address. The destination decision unit and the flow decision unit do not need to have MAC addresses having a long bit length.

Thus, the header processing unit to which the present invention is applied has only to manage only one of identical MAC addresses and does not need to mask a MAC address in a flow entry.

When the key information supply unit is achieved by CAM, the key information supply unit includes a first CAM and a key information table, wherein the first CAM has entries each of which contains a MAC address in a forwarding entry and a MAC address corresponding to a source MAC address or a destination MAC address in a flow entry, and the key information table contains key information corresponding to the entries. When a source MAC address or a destination MAC address of an input frame is inputted, the first CAM searches for an entry matching the MAC address and outputs the address of a matching entry, and the key information supply unit reads key information corresponding to that address from the key information table.

When the destination decision unit is achieved by CAM, the destination decision unit includes a second CAM and a destination information table, wherein the second CAM has entries each of which contains not a MAC address but key information corresponding to a MAC address and a match condition other than a MAC address in a forwarding entry, and the destination information table stores destination information corresponding to the entries.

On the other hand, when the flow decision unit is achieved by CAM, the flow decision unit includes a third CAM and a flow information table, wherein the third CAM has entries each of which has key information corresponding to a source MAC address and a destination MAC address instead of the MAC addresses, and a condition other than a MAC address in a flow condition, and the flow information table stores any one, or two or more of filter information indicating frame transmission, QoS information indicating frame transmission priority, and statistics information that correspond to the entries.

When information including key information corresponding to a destination MAC address of an input frame is inputted to the destination decision unit, the second CAM searches for an entry matching the information and outputs the address of a matching entry, and the destination decision unit reads destination information corresponding to that address from the destination information table. When information including key information corresponding to a source MAC address of an input frame is inputted to the destination decision unit, the second CAM determines whether an entry matching the information exists, and the destination decision unit decides whether learning of the MAC address is required, based on the existence or absence of a corresponding entry. When key information corresponding to a source MAC address and a destination MAC address of an input frame is inputted to the flow decision unit, the third CAM searches for an entry matching the information, and outputs the address of a matching entry, and the flow decision unit reads an entry corresponding to that address of the flow information table. Thus, the header processing unit of the present invention does not need to set plural identical MAC addresses in the CAM, and further does not need to set masks of flow entries in the CAM.

According to solving means of the present invention, a frame switching device, to which plural input ports and plural output ports are connected, decides an output port number of an input frame from header information of an input frame inputted from the input ports, and transmits the input frame to the output port corresponding to the output port number. The frame switching device includes: a key information supply unit that manages addresses and key information having a one-to-one correspondence with the addresses, the key information having a shorter bit length than the addresses, and decides source key information and destination key information corresponding to a source address and a destination address in an input frame, respectively; a destination decision unit that decides an output port number based on the destination key information decided by the key information supply unit, and information other than the source address and the destination address in the input frame; and a flow decision unit that decides flow information based on at least one of source key information and destination key information decided by the key information supply unit, an input port number of an input frame, and information other than the source key information and destination key information in the input frame.

Other problems to be solved by this patent application and means for solving the problems will be made more apparent by "DETAILED DESCRIPTION OF THE PREFERRED EMBODIMENTS" and the accompanying drawings.

According to the present invention, the header processing unit can inexpensively achieve output decision processing and flow decision processing.

According to the present invention, the destination decision unit and the flow decision unit can be inexpensively achieved that provides one common MAC address even when identical MAC addresses exist in forwarding entries and flow entries. Furthermore, according to the present invention, a high speed flow decision unit can be realized that can omit masks of destination MAC addresses and source MAC addresses, and makes unnecessary a huge table that stores indication information of finally matching flow entries. By the present invention, a destination decision unit and a flow decision unit can be achieved that efficiently use CAM capacity by providing only one common MAC address when CAM is used. Furthermore, according to the present invention, a high speed flow decision unit can be achieved that can omit masks corresponding to MAC addresses to effectively use CAM capacity, and makes unnecessary a huge table that stores indication information of finally matching flow entries.

BRIEF DESCRIPTION OF THE DRAWINGS

FIG. 9 is a drawing showing the format of CAM 132 of the present embodiment;

FIG. 10 is a drawing showing the format of a destination information table 133 of the present embodiment;

FIG. 12 is a drawing showing the format of FCAM 143 of the present embodiment;

FIG. 17 is a drawing showing the format of an unused key information table 152 of the present embodiment;

FIG. 18 is a conceptual diagram of a destination decision unit to which Rich Seifert, "LAN Switching Detailed Description" Nikkei BP Inc. is applied.

DETAILED DESCRIPTION OF THE PREFERRED EMBODIMENTS

1. Frame Switching Device

The operation of a frame switching device (switch) having a destination decision unit and a flow decision unit of the present embodiment will be described with reference to FIGS. 2, 3, and 4.

Figure 2:
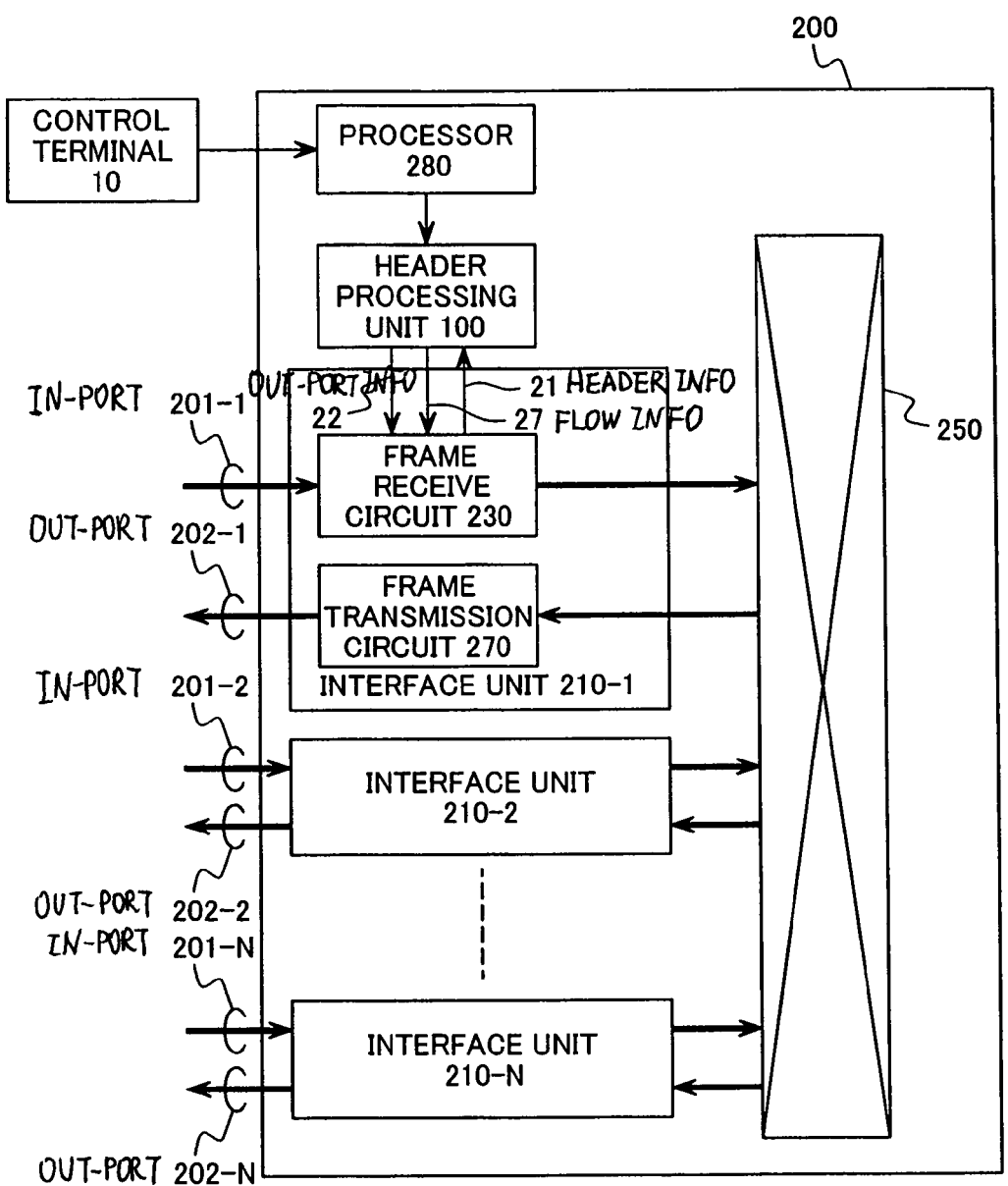
FIG. 2 is a block diagram of a switch 200 of the present embodiment.

FIG. 2 is a block diagram of a switch 200 of the present embodiment.

The switch 200 includes N input ports 201-$i$ (i=1-N) from which frames are inputted, a header processing unit 100 specific to this embodiment, N output ports 202-$i$ (i=1-N), N interface units 210-$i$ (i=1-N), one frame switching means 250 that couples the interface units 210-$i$, and one processor 280. An interface unit 210-$i$ includes a frame receive circuit 230 that receives frames and a frame transmission circuit 270 that transmits frames. Though the header processing unit 100 is connected with all interface units 210-$i$, in the drawing, for the sake of brevity, the header processing unit 100 is connected with only the interface unit 210-1.

Figure 3:
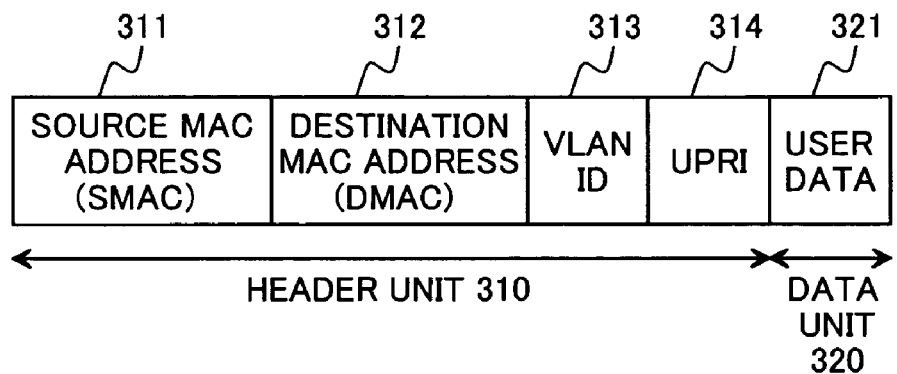
FIG. 3 is a drawing showing the format of a frame inputted to and outputted from the switch 200 of the present embodiment.

FIG. 3 shows an example of the format of a frame that is inputted from the input port 201-$i$ and outputted to the output port 202-$i$. The format includes a header unit 310 and a data unit 320 that stores user data 321. The header unit 310 includes a source MAC address 311 (hereinafter referred to as SMAC) used as a source address of the data link layer, a destination MAC address 312 (referred to as DMAC) used as a destination address, VLAN ID 313 used as the identifier of VLAN (virtual LAN), and user priority 314 (hereinafter referred to as UPRI) representative of transmission priority in a network. Though VLAN is used in this embodiment, a network identifier may be used as required.

Figure 4:
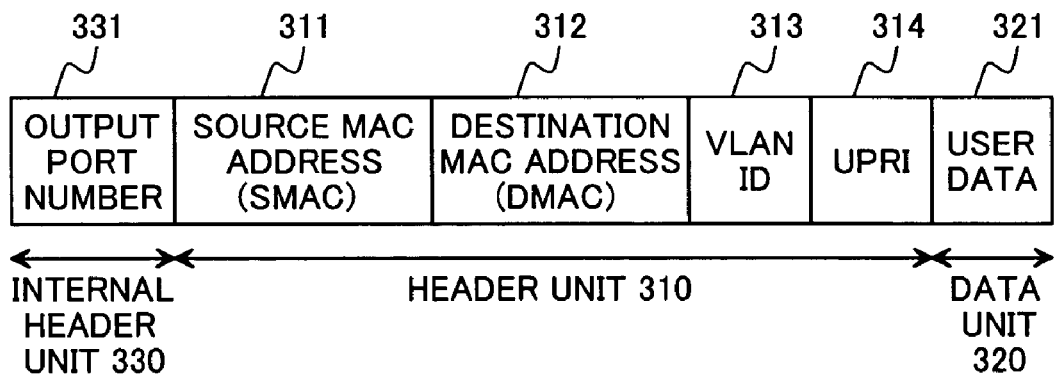
FIG. 4 is a drawing showing the format of a frame in the switch 200 of the present embodiment.

FIG. 4 shows an example of a frame format in the switch 200 of this embodiment. This format has an internal header unit 330 added to the format described previously. This internal header unit 330 includes an output port number 331 used as the number of the port through which an inputted frame is outputted.

When a frame is inputted from the input port 201-$i$, the frame receive circuit 230 stores the frame after adding the internal header unit 330, and transmits all information of the header unit 310 and the number of the port (input port number) through which the frame is inputted, as header information 21, to the header processing unit 100.

The header processing unit 100 performs destination decision processing that decides the output port number of the inputted frame from SMAC 311, DMAC 312, and VLAN ID 313 in the header information 21 and performs address learning for creating a forwarding database. Furthermore, the header processing unit 100 decides the flow of the inputted frame from SMAC 311, DMAC 312, input port number, and VLAN ID 313 in the header information 21, decides filter information and/or QoS information of the flow, and counts input packets for each flow as an example of statistics information. The header processing unit 100 transmits output port information 22 consisting of the decided output port number, and flow information 27 including any one, or more of filter information, and QoS information, to the frame receive circuit 230.

When filter information in the flow information 27 is "transmission", the frame receive circuit 230 writes an output port number in the output port information 22 and QoS information in the flow information 27 to the fields of output port number 331 and UPRI 314, respectively, and transmits them to the frame switching means 250. On the other hand, when filter information in the flow information 27 is "discard", the frame receive circuit 230 does not transmit the stored frame to the frame switching means 250. This frame is overwritten when a next frame arrives, and is finally discarded. The frame switching means 250 transmits the received frame to the frame transmission circuit 270 of an interface unit 210-$i$ corresponding to an output port number 331. The frame transmission circuit 270 has plural queues having different priorities to assign priority to frame transmission, and stores the received frame in an appropriate queue according to UPRI 314. The frame transmission circuit 270 preferentially transmits frames stored in queues having high priority to the output ports 202.

2. Header Processing Unit

Figure 1:
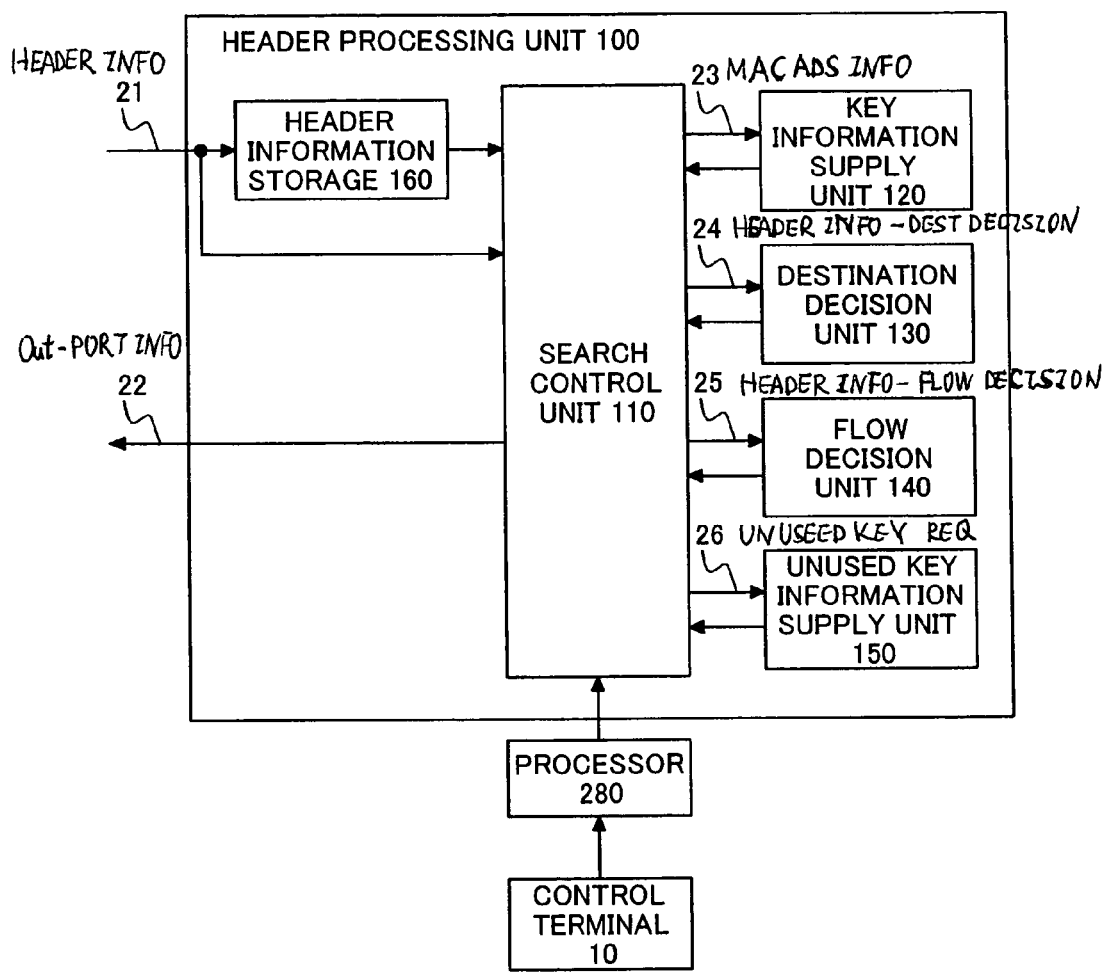
FIG. 1 is a block diagram of a header processing unit 100 of the present embodiment.

FIG. 1 is a block diagram of the header processing unit 100 to which the present embodiment is applied.

Hereinafter, a description will be made of the configuration and detailed operation of the header processing unit 100 shown in FIG. 1. The header processing unit 100 includes a header information storage 160 that stores header information 21, a key information supply unit 120 specific to the present embodiment, a destination decision unit 130, a flow decision unit 140, and an unused key information supply unit 150. The key information supply unit 120 of the header processing unit 100 has MAC addresses in forwarding entries and all MAC addresses corresponding to SMAC and DMAC in flow entries, and manages MAC key information having short bit length that corresponds to the addresses. When plural identical MAC addresses exist in forwarding entries and flow entries, the key information supply unit 120 has only to manage one MAC address and MAC key information corresponding to the address. On receiving the header information 21, the key information supply unit 120 decides SMAC key information and DMAC key information, which are MAC key information corresponding to SMAC and DMAC of input frame.

As one example, assume that a forwarding data base houses 2 k forwarding entries, and there are 2 k flow entries for filter information, QoS information, and statistics information collection, respectively. When a forwarding entry contains one MAC address, and each flow entry contains two MAC addresses, SMAC and DMAC, a maximum number of MAC addresses to be identified by the header processing unit 100 is 14 k (2 k+2 k×3×2) MAC key information can be sufficiently represented in 13 bits (the 13th power of two >14 k), which is much shorter than 48 bits, which are bit length of MAC addresses. Even if the number of entries to be supported by the forwarding data base and a flow table increases, since the bit length of MAC key information increases as the logarithm of the number of entries, an increase in the number of entries little affects the bit length of MAC key information.

The destination decision unit 130 contains compressed MAC key information instead of MAC addresses in forwarding entries, and uses DMAC key information instead of DMAC as a search key to search for a matching entry and obtain the output port number of a received frame. It also uses SMAC key information as a search key instead of SMAC to search for a matching entry and determine the need of address learning. Similarly, the flow decision unit 140 has SMAC key information and DMAC key information that are compressed, instead of SMAC and DMAC that have long bit length, as flow condition, uses the SMAC key information and DMAC key information as part of search key to search for a matching flow condition and decide a flow, and obtains filter information and QoS information of a received frame and collects statistics information. The header processing unit 100 of the present embodiment registers MAC addresses having long bit length one for individual MAC addresses, and does not need to set a plural number of identical MAC addresses as in Uga et. al. "Flow Identification Method by Use of Contents Addressable Memory" Institute Electronic, Information and Communication and Engineers, 2000 Comprehensive Convention Lecture Papers SB-4-2 and V. Srinivasan, G. Varghese, S. Suri, M. Waldvogel, "Fast and Scalable Layer Four Switching", Proceedings of ACM SIGCOMM '98, p 191-202. When CAM is used for searching in the header processing unit 100 of the present invention, inexpensive destination decision unit and flow decision unit are achieved that efficiently use the capacity of the CAM.

3. Details of the Header Processing Unit (Destination Decision Processing)

More detailed operation of the header processing unit 100 will be described.

When the header information 21 is inputted, the header information storage 160 stores the information, and the search control unit 110 starts proper processing. The search control unit 110 transmits SMAC and DMAC of a received packet stored in the header storage 160 to the key information supply unit 120 as MAC address information 23. The key information supply unit 120 decides SMAC key information and DMAC key information that have shorter bit length than MAC addresses, from that information.

Figure 5:
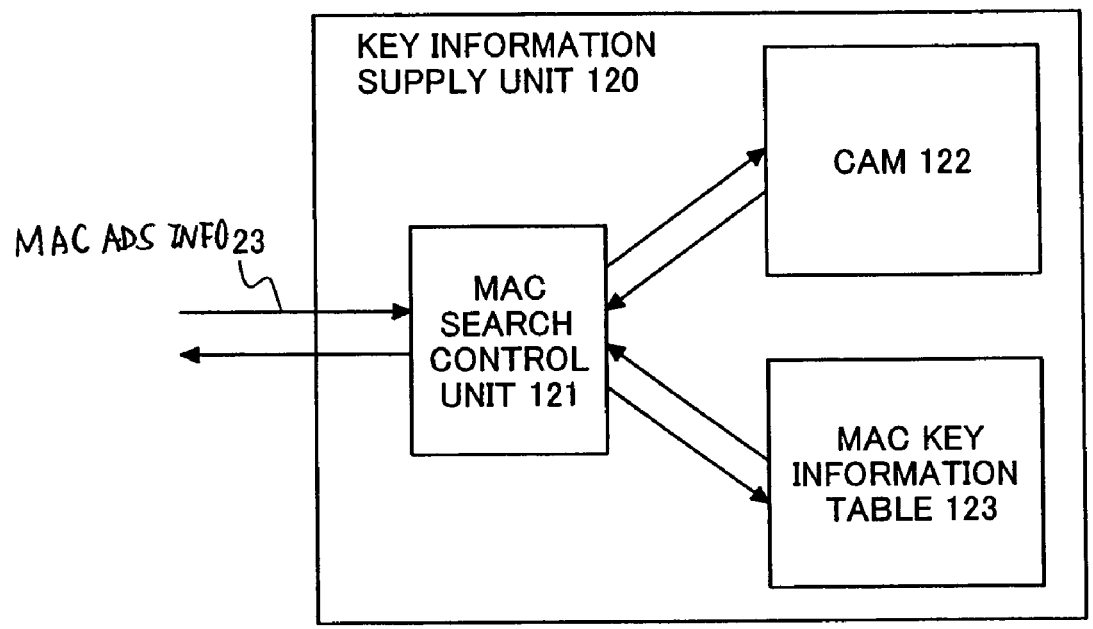
FIG. 5 is a block diagram showing a key information supply unit 120 of the present embodiment.

FIG. 5 shows an embodiment of the key information supply unit 120 when CAM is used. The key information supply unit 120 of FIG. 5 includes a MAC search control unit 121, CAM 122, and a MAC key information table 123.

Figure 6:
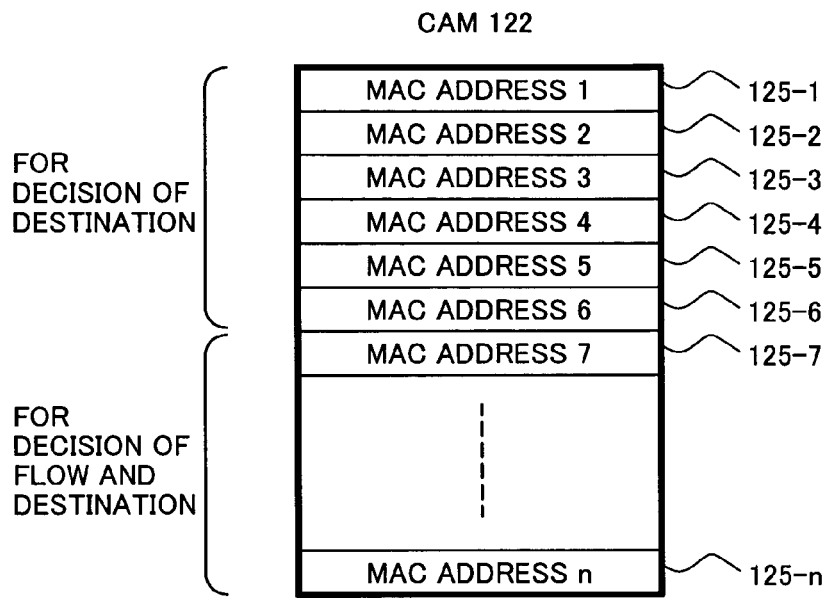
FIG. 6 is a drawing showing the format of CAM 122 of the present embodiment.
Figure 7:
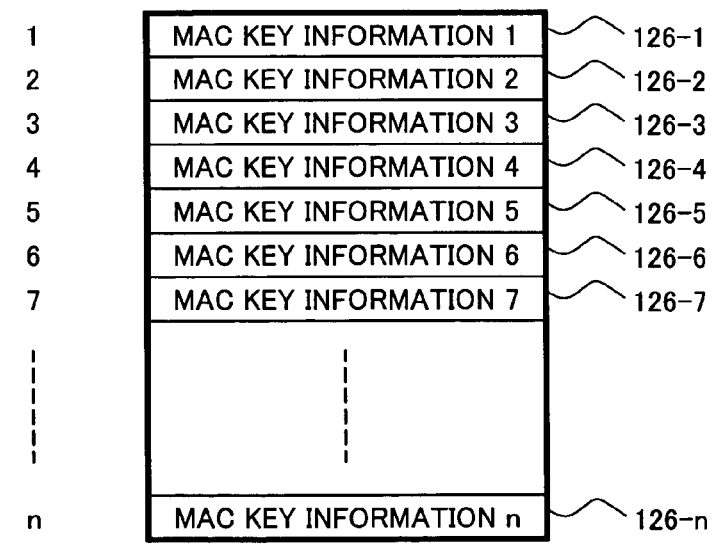
FIG. 7 is a drawing showing the format of a MAC key information table 123 of the present embodiment.

FIGS. 6 and 7 show details of the CAM 122 and the MAC key information table 123, respectively.

The CAM 122 is stored with SMACs and DMACs of flow conditions of flow entries, and MAC addresses in forwarding entries. In FIG. 6, six entries (entries 125-1 to 125-6) are set as MAC addresses in forwarding entries (for decision of destination) and n-6 entries (entries 125-7 to 125-n) are set as MAC addresses contained both in flow conditions and forwarding entries.

Entries 126-$i$ ($i$=1 to n) of the MAC key information table 123 of FIG. 7 are stored with MAC key information corresponding to individual entries 125-$i$ of the CAM 122. For duplicate MAC addresses, only one MAC address is set in the CAM 122, and masks in flow entries may be omitted.

Figure 19:
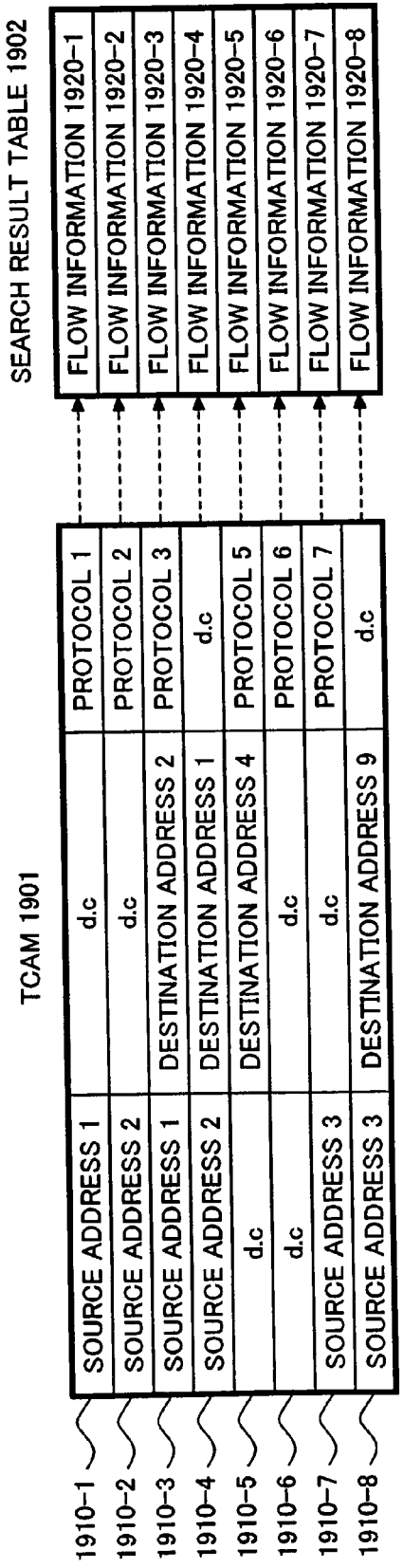
FIG. 19 is a conceptual diagram of a flow decision unit to which Uga et. al. "Flow Identification Method by Use of Contents Addressable Memory" Institute Electronic, Information and Communication and Engineers, 2000 Comprehensive Convention Lecture Papers SB-4-2 is applied.

Assume that entries equivalent to forwarding entries and flow entries achieved by FIGS. 18 and 19 exist, and a source address x and a destination address x of FIG. 19 correspond to a MAC address x. In FIGS. 18 and 19, the CAM 1801 is stored with MAC addresses 1 to 8 in entries 1810-1 to 1810-8, and the TCAM 1901 is stored with MAC addresses 1 to 3 as conditions of source addresses and MAC addresses 1, 2, 4, and 9 as conditions of destination addresses. In this case, the CAM 122 has only to be stored with MAC addresses 1 to 9 individually; duplicate MAC addresses 1 to 4 do not need to be stored plurally. Furthermore, masks (d.c) of source addresses and destination addresses in the TCAM 1901 may be omitted and are not stored in the CAM 122. On receiving MAC address information 23, the MAC search control unit 121 transmits DMAC to the CAM 122 to decide DMAC key information. The CAM 122 searches for an entry 125 matching the DMAC, and outputs the address of the CAM 122 in which a matching entry 125 is stored, to the MAC search control unit 121. The MAC search control unit 121 reads the entry 126 of the MAC key information table 123 that corresponds to that address, and transmits it to the search control unit 110 as DMAC key information. When there is no matching entry 125, it transmits the information indicating that there is no matching entry 125, to the MAC search control unit 121. The MAC search control unit 121 transmits '0' being default key information to the search control unit 110 as DMAC key information.

Next, the MAC search control unit 121 transmits SMAC to the CAM 122 to decide SMAC key information. The CAM 122 searches for an entry 125 matching the SMAC, and outputs the address of the CAM 122 in which the matching entry 125 is stored, to the MAC search control unit 121. The MAC search control unit 121 reads the entry 126 of the MAC key information table 123 that corresponds to that address, and transmits it to the search control unit 110 as SMAC key information. When there is no matching entry 125, it transmits the information indicating that there is no matching entry 125, to the MAC search control unit 121. The MAC search control unit 121 transmits '0' being default key information to the search control unit 110 as SMAC key information.

On receiving SMAC key information and DMAC key information, the search control unit 110 transmits that key information and VLAN ID in the header information storage 160 to the destination decision unit 130 as header information for decision of destination 24. The destination decision unit 130 decides an output port number from the received header information for decision of destination 24, and transmits information including output port number information to the search control unit 110.

Figure 8:
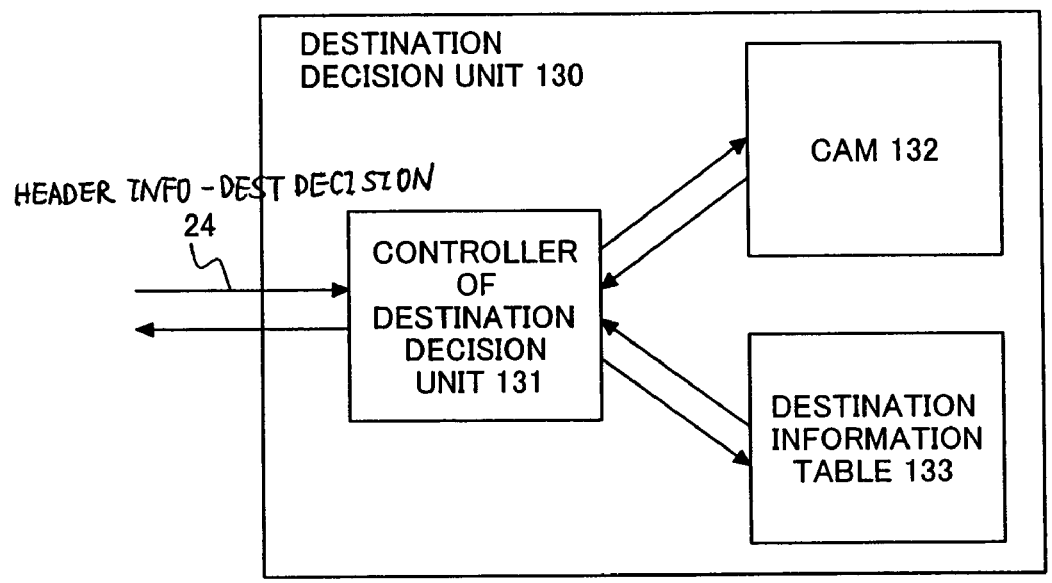
FIG. 8 is a block diagram showing a destination decision unit 130 of the present embodiment.

FIG. 8 shows an example of a detailed block diagram of the destination decision unit 130 that uses CAM. The destination decision unit 130 of FIG. 8 includes a controller of a destination decision unit 131, CAM 132, and a destination information table 133.

FIGS. 9 and 10 show details of the CAM 132 and the destination information table 133, respectively.

Entries 135-*i* including MAC key information and VLAN ID are registered in the CAM 132. In the destination information table 133, output port numbers corresponding to the individual entries 135 are registered as entries 136.

On receiving header information for decision of destination 24, the controller of the destination decision unit 131 transmits DMAC key information and VLAN ID to the CAM 132 to perform destination decision. The CAM 132 searches for a matching entry 135, and outputs the address of the CAM 132 in which the matching entry 135 is stored, to the controller of the destination decision unit 131. The controller of the destination decision unit 131 reads the entry 136 of the destination information table 133 that corresponds to that address, and transmits it to the search control unit 110 as an output port number. The search control unit 110 transmits the received output port number to the frame receive circuit 230 as output port information 22. When there is no matching entry 135, it transmits the information indicating that there is no matching entry 135, to the controller of the destination decision unit 131. The controller of the destination decision unit 131 transmits the information indicating that there is no destination information, to the search control unit 110.

On receiving from the destination decision unit 130 the information indicating that there is no destination information, the search control unit 110, to transmit the frame to all output ports of the switch 200, transmits the line number '0' that indicates that the received packet should be transmitted to all output ports, to the frame receive circuit 230. On receiving a frame having an output port number 331 of '0', the frame switching means 250 transmits a copy of the received frame to interface units 210 other than the interface unit 210 through which the frame has been received.

By the above-mentioned processing, when a pair of DMAC and VLAN ID in a frame exists in forwarding entries, a corresponding output port number is sent to the search control unit 110. When the pair of DMAC and VLAN ID does not exist in forwarding entries, the information indicating that there is no destination information is sent to the search control unit 110. In the key information supply unit 120, when a MAC address corresponding to DMAC does not exist in the CAM 122 (DMAC key information is a default value (e.g., 0)), since the default value is not set in the CAM 132 as key information, the information indicating that there is no destination information is sent to the search control unit 110.

(Address Learning)

To determine the need of MAC address learning, the controller of destination decision unit 131 transmits SMAC key information and VLAN ID to the CAM 132. The CAM 132 searches for a matching entry 135, and only when a matching entry 135 is not registered, transmits to the controller of destination decision unit 131 the information indicating there is no matching entry 135. The controller of destination decision unit 131 transmits the information indicating that learning is required, to the search control unit 110. By the above-mentioned processing, when a pair of SMAC and VLAN ID that does not exist in the CAM 132 is inputted, the information indicating that MAC address learning is required is sent to the search control unit 110. Since the default value (e.g., 0) is not set in the CAM 132 of the key information supply unit 120 as key information, if SMAC key information is the default value, there is no matching entry 135.

On receiving from the destination decision unit 130 the information indicating that learning is required, the search control unit 110, to obtain key information corresponding to SMAC, transmits an unused key information request 26 to an unused key information supply unit 150.

Figure 16:
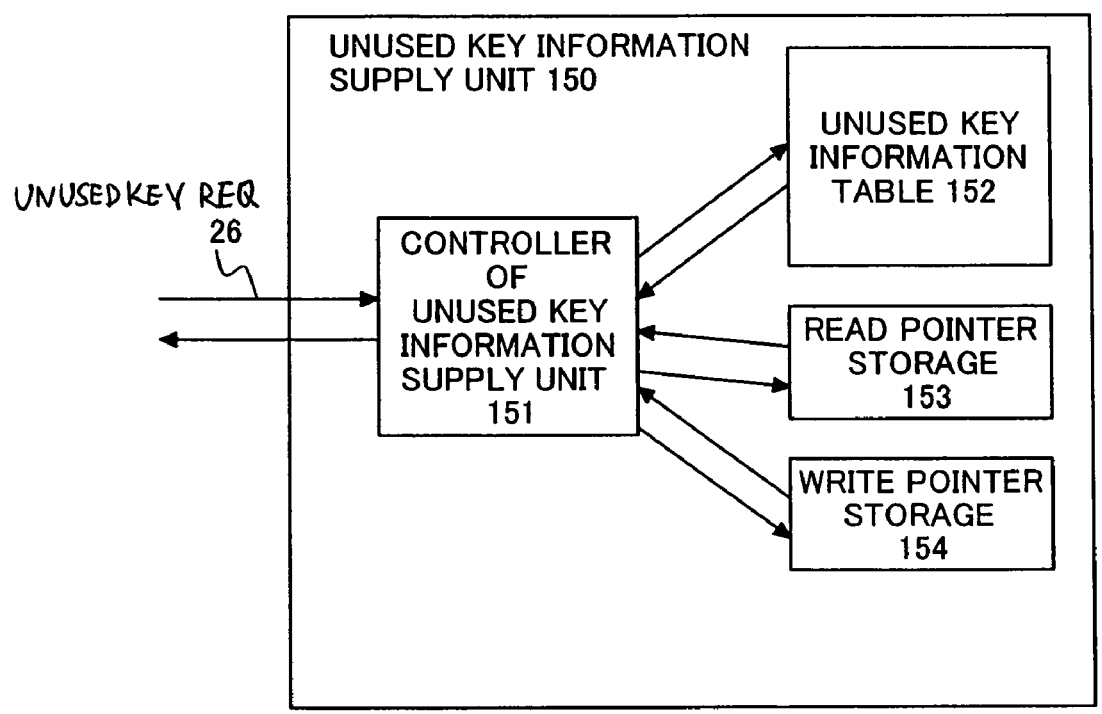
FIG. 16 is a block diagram showing an unused key information supply unit 150 of the present embodiment.

FIG. 16 is a block diagram of the unused key information supply unit 150 of the present embodiment.

The unused key information table supply unit 150 shown in FIG. 16 includes an unused key information supply control unit 151, an unused key information table 152 that stores unused key information, a read pointer storage 153 that stores read addresses of the table 152, and write pointer storage 154 that stores write addresses.

FIG. 17 is a drawing showing the format of the unused key information table 152 of the present embodiment. Unused key information 167 in the table 152 that are stored in entries from "read address" to "write address-1" is usable unused key information. For example, when a read address is '2' and a write address is '6', unused key information 167-2 to 167-5 is usable key information. On receiving an unused key information request 26, the unused key information supply control unit 151 reads unused key information stored in an entry 167 corresponding to the read address from table 152, transmits it to the search control unit 110 as unused key information, and disables a read address produced by adding 1 to the read address. Such acquisition of unused key information is required also in addition of flow entries. Detailed operation of this will be described later. On the other hand, key information is released by deleting a relevant forwarding entry that has not been used for a preset period of time, or deleting a relevant flow entry by a manager.

The search control unit 110 transmits unused key information corresponding to acquired SMAC, and SMAC in the header information storage 160 to the key information supply unit 120, and transmits the acquired unused key information, VLAN ID and input port number in the header information storage 160 to the destination decision unit 130. The key information supply unit 120 writes the received SMAC and key information (unused key information) to identical addresses of the CAM 122 and the MAC key information table 123. The destination decision unit 130 sets key information and VLAN ID in the CAM 132, and an input port number in a corresponding entry 136 of the destination information table 133.

The following describes initial setting values of the unused key information table 152, the read pointer storage 153, and the write pointer storage 154. Like the above description, assume that the forwarding data base houses 2 k forwarding entries, and there are 2 k flow entries for filter information, QoS information, and statistics information collection, respectively. In this case, the number of entries "p" of the unused key information table 152 is 14 k (2 k+2 k×3×2). Preferably, in the unused key information table 152, initial values of 1 to 14 k except the default key information '0' are sequentially set in entries 167-*i*, address '1' is set in the read pointer storage 153, and address '14 k' is set in the write pointer storage 154.

(Flow Decision Processing)

In parallel with the destination decision processing and address learning described above, the flow decision unit 140 executes flow decision processing. In this processing, the search control unit 110 transmits SMAC key information and DMAC key information, and VLAN ID and an input port number in the header storage 160 to the flow decision unit 140 as header information for flow decision 25. Based on the received information, the flow decision unit 140 performs three flow decisions such as for decision of filter information, for decision of QoS information, and for statistics information collection, decides filter information and QoS information before transmitting them to the search control unit 110, and increments the counter of flow detected for statistics information collection by one. The flow decision unit 140 may perform any one, or two or more of filter information decision, QoS information decision, statistics information collection, and other flow decisions.

Figure 11:
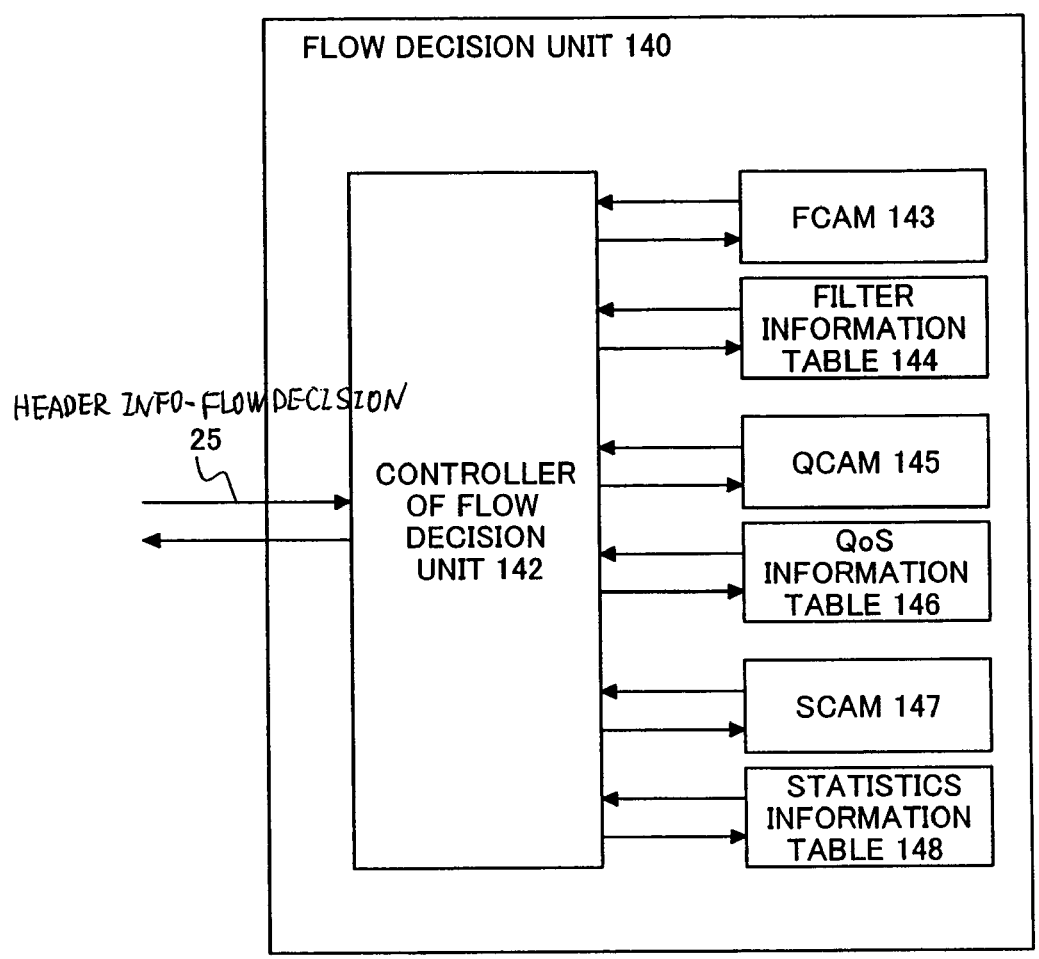
FIG. 11 is a block diagram showing a flow decision unit 140 of the present embodiment.
Figure 13:
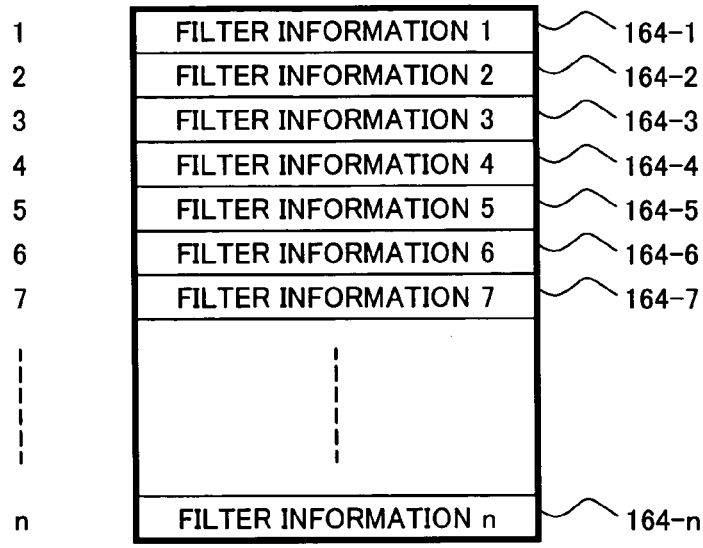
FIG. 13 is a drawing showing the format of a filter information table 144 of the present embodiment.
Figure 14:
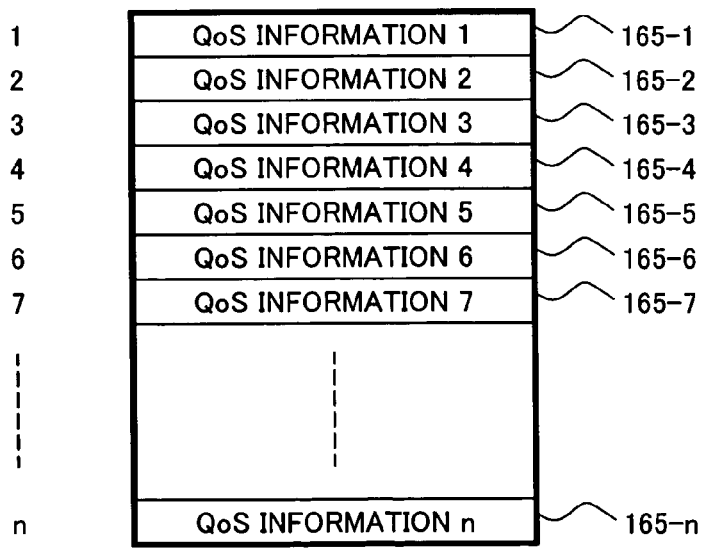
FIG. 14 is a drawing showing the format of a QoS information table 146 of the present embodiment.
Figure 15:
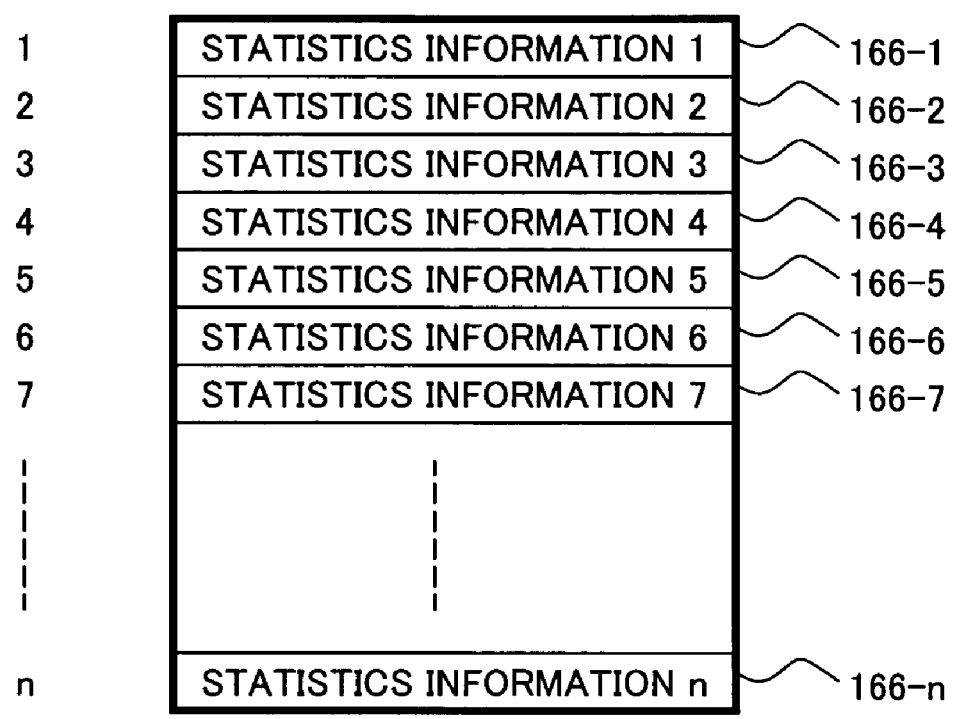
FIG. 15 is a drawing showing the format of a statistics information table 148 of the present embodiment.

FIG. 11 is a detailed block diagram of the flow decision unit 140 when CAM is used.

The flow decision unit 140 of FIG. 11 includes a controller of flow decision processing unit 142, CAM (FCAM) 143 for filter, a filter information table 144, CAM (QCAM) 145 for QoS information decision, a QoS information table 146, CAM(SCAM) 147 for statistics information collection, and a statistics information table 148 that stores the counter that counts the number of input packets for each flow.

FIGS. 12 to 15 show details of FCAM 143, a filter information table 144, a QoS information table 146, and a statistics information table 148.

The FCAM 143 contains entries 163-*i* each consisting of SMAC key information corresponding to SMAC in flow condition, DMAC key information corresponding to DMAC in flow condition, an input port number, and VLAN ID. The format of the QCAM 145 and the SCAM 147 is also the same as that of the FCAM 143. The filter information table 144 contains filter information corresponding to entries 163-*i* of the FCAM (that is, corresponding to flow condition) as entries 164-*i*. The QoS information table 146 contains QoS information corresponding to entries of the QCAM 145, and the statistics information table 148 contains statistics information corresponding to entries of the SCAM 147 (counter representative of the number of input packets). In the FCAM 143, the QCAM 145, and the SCAM 147, MAC key information set in the CAM 132 of the destination decision unit 130 is set again or two or more pieces of the MAC key information are set. Also, masks of key information may be set. However, since the key information, which has about 13 bits as described previously, is smaller than MAC addresses of 48 bits, the header processing unit 110 of the present embodiment can significantly reduce CAM capacity in the prior art.

On receiving header information for flow decision 25 from the search control unit 110, the controller of flow decision processing unit 142 transmits SMAC key information, DMAC key information, input port number, and VLAN ID to the FCAM 143, the QCAM 145, and the SCAM 147. Each of the CAMs searches for a matching entry and outputs the CAM address of a matching entry to the controller of flow decision processing unit 142. The controller of flow decision processing unit 142 reads entries corresponding to the addresses from the filter information table 144 and the QoS information table 146, respectively, and transmits them to the search control unit 110 as filter information and QoS information. Furthermore, the controller of flow decision processing unit 142 reads statistics information from the statistics information table 148, increments the statistics information by one (or the counts the number of packets), and writes it back to identical entries 166.

Setting of flow conditions in the FCAM 143, the QCAM 145, and the SCAM 147, setting of QoS information and filter information in the filter information table 144, the QoS information table 146, and the statistics information table 148, and resetting of statistics information are performed by the control terminal 10 shown in FIGS. 1 and 2. The operator inputs data necessary for the settings and reset by the control terminal 10 (e.g., any one, or two or more of SMAC, DMAC, VLAN ID, input port number, SMAC key, DMAC key, flow information, and the like).

On receiving a reset value (e.g., 0) of flow condition, QoS information, filter information, or statistics information inputted from the control terminal 10, the processor 280 directs the search control unit 110 of the header processing unit 100 to write the information. The search control unit 110 sets the input port number and VLAN ID of the flow condition inputted from control terminal 10 in the FCAM 143, the QCAM 145, and the SCAM 147 through the controller of flow decision processing unit 142, and writes filter information, QoS information, and a reset value (e.g., 0) to the filter information table 144, the QoS information table 146, and the statistics information table 148.

For SMAC and DMAC of flow condition, to acquire SMAC key information and DMAC key information corresponding to these MAC addresses, the search control unit 110 transmits SMAC and DMAC inputted from the control terminal 10, received from processor 280, to the key information supply unit 120. The operation of the key information supply unit 120 is the same as that at the time of packet reception. Specifically, when MAC addresses matching the received SMAC and DMAC are stored in the CAM 122, the key information supply unit 120 transmits key information corresponding to the matching MAC addresses to the search control unit 110 as SMAC key information and DMAC key information. When not stored, the search control unit 110 transmits the default key information (e.g., 0) to the search control unit 110. When the SMAC key information and the DMAC key information are '0', the search control unit 110 requests the unused key information supply unit 150 to supply unused key information to acquire the key information. The operation of the unused key information supply unit 150 is the same as the above-mentioned operation. The search control unit 110 writes SMAC and the acquired SMAC key information through the MAC search control unit 121 to identical addresses of the CAM 122 and the MAC key information table 123, respectively. Likewise, it writes DMAC and DMAC key information to the CAM 122 and the MAC key information table 123. Furthermore, it sets the acquired SMAC key information and DMAC key information in the CAMs (FCAM 143, QCAM 145, SCAM 147) through the controller of flow decision processing unit 142.

By the above-mentioned series of processings, the settings of flow conditions, filter information, and QoS information, and the resetting of statistics information are performed.

What is claimed is:

1. A frame switching device, to which a plurality of input ports and a plurality of output ports are connected, for deciding an output port number of an input frame inputted from the input ports from header information of the input frame and transmitting the input frame to the output port corresponding to the output port number, the frame switching device comprising:
- a key information supply unit that:
  - holds a first contents addressable memory (CAM) that has entries each of which is a forwarding entry that contains a respective destination MAC address or a flow entry that contains an address corresponding to a respective source MAC address or a respective destination MAC address,
  - holds a key information table that has a respective key information entry corresponding to each of the entries of the first CAM containing key information that respectively identifies the respective source or the respective destination MAC addresses of the corresponding entry of the first CAM and has a shorter bit length than the MAC addresses of the entries of the first CAM,
  - manages source and destination MAC addresses for transmitting the input frame, source key information corresponding to the source MAC addresses of the input frame, and destination key information corresponding to the destination MAC addresses of the input frame, and
  - respectively decides the source key information and the destination key information corresponding to the source MAC address and the destination MAC address in an input frame;
- a destination decision unit that holds a second contents addressable memory (CAM) that has entries in which each entry respectively contains key information and information other than a source MAC address and a destination MAC set in a correspondence relationship, holds a destination information table that has a respective entry for each of the entries of the second CAM that stores a destination corresponding to the entry of the second CAM, and decides an output port number for the input frame based on the destination key information decided by the key information supply unit for the input frame and the information different from the source MAC address and the destination MAC address in the input frame; and
- a flow decision unit that decides flow information based on at least one of the source key information and the destination key information decided by the key information supply unit for the input frame, an input port number of the input frame, and information other than the source MAC address and the destination MAC address in the input frame.

2. The frame switching device according to claim 1,
wherein, when the source MAC address or the destination MAC address of the input frame is inputted, the first CAM searches for an entry matching the source MAC address or destination MAC address and outputs the address of a matching entry, and
the key information supply unit reads the source key information or the destination key information respectively corresponding to the source MAC address or the destination MAC address from the key information table.

3. The frame switching device according to claim 1,
wherein, when information including the destination key information of the input frame and the information other than the source MAC address and the destination MAC address is inputted, the second CAM searches for an entry matching the information and outputs the address of the matching entry, and
the destination decision unit reads destination information corresponding to the MAC address from the destination information table.

4. The frame switching device according to claim 1,
wherein, when information including the source key information of the input frame and the information other than the source MAC address and the destination MAC address is inputted, the second CAM checks for the existence of an entry matching the information, and
the destination decision unit decides whether address learning is required, based on whether the matching entry exists.

5. The frame switching device according to claim 4,
further including an unused key information supply unit that, when the destination decision unit decides that address learning is required, receives notification of an address learning requirement, and acquires and transmits unused key information corresponding to the source MAC address,
wherein the key information supply unit and the destination decision unit store an entry including the acquired unused key information.

6. The frame switching device according to claim 1,
wherein the flow decision unit comprises:
a third contents addressable memory (CAM) in which flow conditions including the source key information and the destination key information, and at least one of input line information and information other than the source MAC address and the destination MAC address are set as entries, and
a flow information table in which one or more of filter information corresponding to the entries indicating frame transmission or discard, QoS information indicating frame transmission priority, and statistics information are stored.

7. The frame switching device according to claim 6,
wherein, when a flow condition on the input frame is inputted, the third CAM searches for an entry matching the information and outputs the address of the matching entry, and
the flow decision unit reads an entry that corresponds to the address from the flow information table.

8. The frame switching device according to claim 1, further including a search control unit, connected to the key information supply unit, the destination decision unit, and the flow decision unit, for controlling transmission of information in the input frame to different units, data transmission among different units, and output of output port information.

9. The frame switching device according to claim 1,
wherein the key information is obtained based on information including MAC addresses inputted from a terminal, and using the obtained key information to set or reset entries stored in the key information supply unit, the destination decision unit, and the flow decision unit.

10. The frame switching device according to claim 1,
wherein the key information is a source or destination address identifier number.

* * * * *